(12) United States Patent
Usui et al.

(10) Patent No.: US 6,774,605 B2
(45) Date of Patent: Aug. 10, 2004

(54) BATTERY PACK CHARGING DEVICE

(75) Inventors: Yutaka Usui, Tokyo (JP); Michihito Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/263,026

(22) Filed: Oct. 2, 2002

(65) Prior Publication Data

US 2003/0085685 A1 May 8, 2003

(30) Foreign Application Priority Data

Oct. 3, 2001 (JP) ...................................... 2001-308083

(51) Int. Cl.[7] .............................................. H02J 7/00
(52) U.S. Cl. ..................................................... 320/112
(58) Field of Search ................................ 320/112, 110, 320/107, 113, 114; 429/96, 99; 213/107; 439/221, 217, 218, 626

(56) References Cited

U.S. PATENT DOCUMENTS

| | | | | |
|---|---|---|---|---|
| 4,645,995 A | * | 2/1987 | Terrell et al. ............... | 320/110 |
| 4,816,735 A | * | 3/1989 | Cook et al. .................. | 320/110 |
| 5,187,422 A | * | 2/1993 | Izenbaard et al. ........... | 320/110 |
| 5,543,702 A | * | 8/1996 | Pfeiffer ........................ | 320/110 |
| 5,926,005 A | * | 7/1999 | Holcomb et al. ........... | 320/113 |
| 6,583,600 B2 | * | 6/2003 | Haga et al. .................. | 320/110 |

* cited by examiner

*Primary Examiner*—Pia Tibbits
(74) *Attorney, Agent, or Firm*—Frommer Lawrence & Haug LLP; William S. Frommer; Leonard J. Santisi

(57) ABSTRACT

A battery pack charging device having a terminal which may be adaptively used even in case the battery pack is loaded in different loading directions to enable charging and detection of loading to reduce the cost. The battery pack charging device includes, in a loading section 4 or 24 in which a battery pack 15 or 30 is loaded, a charging terminal member 7 or 29, connected to a charging terminal unit 16 or 31, respectively, an actuation member 55 actuated by the battery pack and a detection switching unit 11 having switching elements 49, 50 opened or closed by the actuation member 55. The charging terminal unit 16 or 31 is mounted to a terminal block member 40 so as to be connected to the charging terminal member 7 of the first battery pack 15 or to the charging terminal member 29 of the second battery pack 30, respectively, in such a manner that the actuation member 55 can be actuated in the same direction by the first battery pack or by the second battery pack.

4 Claims, 5 Drawing Sheets

BATTERY PACK CHARGING DEVICE

BACKGROUND OF THE INVENTION

1. Field of the Invention

This invention relates to a battery pack charging device for charging a battery pack accommodated in e.g., portable electronic equipment to supply DC power thereto.

2. Description of Related Art

A battery pack charging device charges a battery pack, comprised of for example a lithium ion secondary cell, sealed in a casing, with the battery pack being loaded in a battery loading section of the charging device. In general, the battery pack charging device includes a DC power supply circuit, a current detection circuit or a control circuit, enclosed in a housing, and also includes, in the battery loading section, a charging terminal unit for connection to a charging terminal of the battery pack, and a communication terminal for exchanging the information with the battery pack. The battery loading section of the battery pack charging device is provided with a detection switch for detecting the loading of the battery pack.

When the loading of the battery pack into the battery loading section has been confirmed by a detection switch, the DC current is supplied from a DC power supply to the charging terminal for charging the battery pack.

Meanwhile, in the battery pack charging device, the respective terminals of the charging terminal unit provided in the battery pack are reduced in pitch, in keeping with reduction in size and thickness of electronic equipment, as a consequence of which the terminals of the charging terminal unit are also reduced in pitch. In the battery pack charging device, the detection switch has to detect the battery pack of preset design parameters, loaded in the battery loading section, to high precision, and hence the detection switch is provided in the battery loading section as the detection switch is positioned to high accuracy relative to the charging terminal unit.

On the other hand the battery loading section of the battery pack charging device is of varied structures in order to cope with varied design parameters for voltage, charging or outer shapes of the battery packs used for a wide variety of electronic equipment. The conventional battery pack charging device has a drawback in that, since the charging terminal unit and the detection switch are assembled in the battery charging sections in a state in which the charging terminal unit and the detection switch are assembled in position relative to one another, the structure is complicated, while the number of assembling steps is increase to render it difficult to maintain the assembling accuracy. In the battery pack charging device, the charging terminal unit and the detection switch may be of a unified structure and arranged in this state in the battery loading section to assure high precision relative positioning.

However, since the battery pack charging device is constructed to meet widely diversified battery packs, the unit comprised of a unified structure of the charging terminal unit and the detection switch has to be changed for each new version of the battery pack. The unit comprised of the unified structure of the charging terminal unit and the detection switch, formed by a metal die device from e.g., a synthetic resin material, needs to be of high precision and hence is expensive, thus excessively raising the cost of the battery pack charging device. In particular, in the battery pack charging device, the battery pack may be introduced into the battery loading section at for example 90° different positions, such as in the vertical direction and in the horizontal direction. In such case, totally different units must be prepared for these two inserting directions, thus not only raising the cost but also protracting the term of production.

SUMMARY OF THE INVENTION

It is therefore an object of the present invention to provide a battery pack charging device including a terminal structure which, even if the battery pack is loaded in a different loading direction, may be adaptively used to enable the charging of the battery pack and reliable loading detection to reduce the cost.

For accomplishing the above object, the present invention provides a charging device for charging a battery pack including a charging terminal member arranged in a loading section in which the battery pack is accommodated, the charging terminal member being connected to a charging terminal of the battery pack, and a detection switch including an actuation member actuated by the battery pack and a switching element opened/closed by the actuation member, the detection switch serving for detecting the loading of the battery pack. A first battery pack and a second battery pack, having different loading directions, are introduced into the loading section of the battery pack loading device. A charging terminal member and a detection switch are loaded on a terminal block member of synthetic resin mounted in the loading section of the battery pack charging device. The battery pack charging device is assembled in such a manner that the charging terminal member can be connected to charging terminals of the first and second battery packs, while the actuation member of the detection switch can be actuated in the same direction by the first and second battery packs.

In the battery pack loading device, the actuation member is slidably assembled to a slide guide unit provided to the terminal block member, and a slide guide projection and a slide guide recess are provided to the outer lateral surface of the actuation member and to the inner surface of the slide guide recess, respectively. In the battery pack charging device, the actuation member is provided with an actuation part protruded into the loading section so as to be thrust by the battery pack. This actuation part is made up by an inclined cam thrust by the first battery pack and a vertically extending cam thrust by the second battery pack.

With the present battery pack charging device, according to the present invention, the terminal block member, carrying the charging terminal unit and the detection switch for detecting the loading of the battery pack, is adaptively used for the loading section for loading the battery pack in substantially the horizontal direction and for the loading section for loading the battery pack in substantially the vertical direction. Thus, with the present battery pack charging device, it is possible to reduce the cost by making common use of a metal die for molding the terminal block member, which is narrow in manufacturing tolerance and expensive. Moreover, with the present battery pack charging device, the detection switch is able to detect the battery pack loaded in different loading directions, with the charging terminal section being connected to the charging terminal of the battery pack to effect charging. Additionally, with the present battery pack charging device, the detection switch and the charging terminal unit may be positioned relative to each other on loading thereof to the terminal block member to assure reliable battery pack loading detection and charging.

DESCRIPTION OF THE PREFERRED EMBODIMENTS

Figure 1:
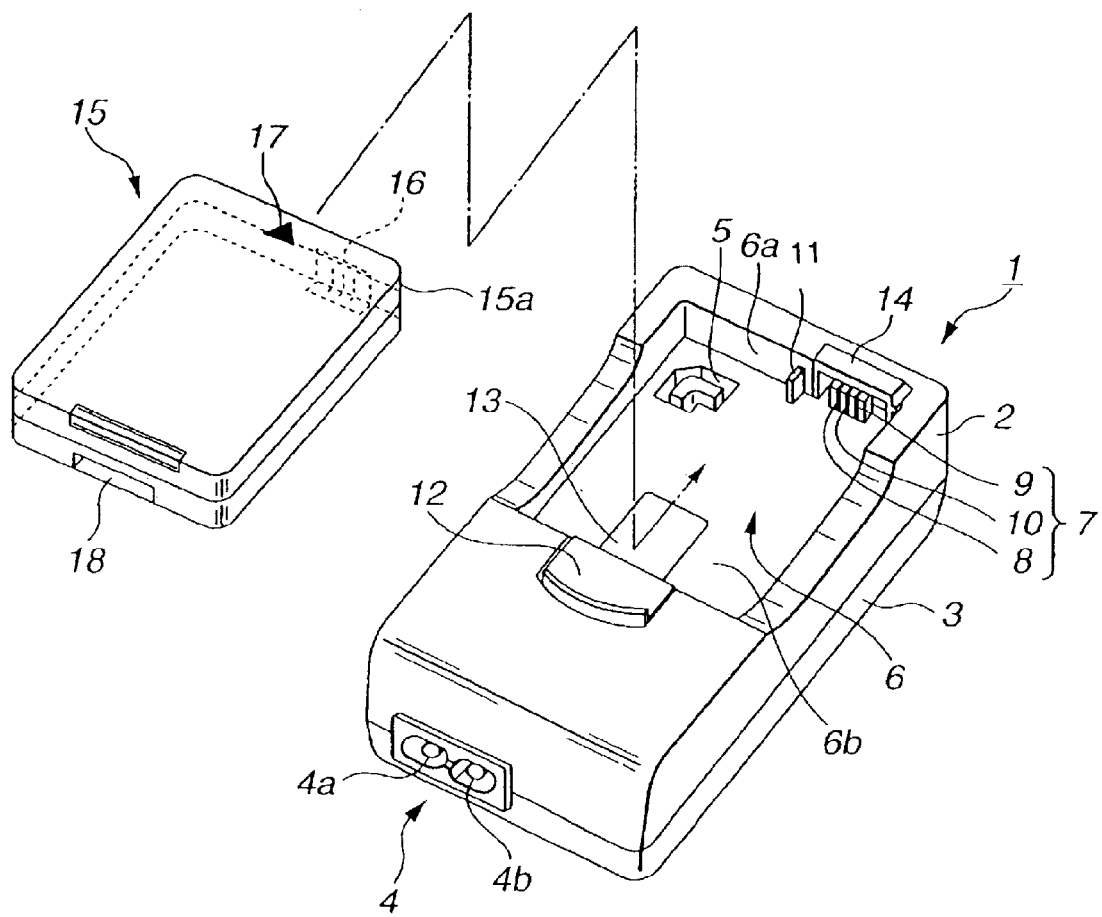
FIG. 1 is a perspective view of a battery pack charging device in which a battery pack according to a first embodiment of the present invention is loaded in a horizontal direction.
Figure 2:
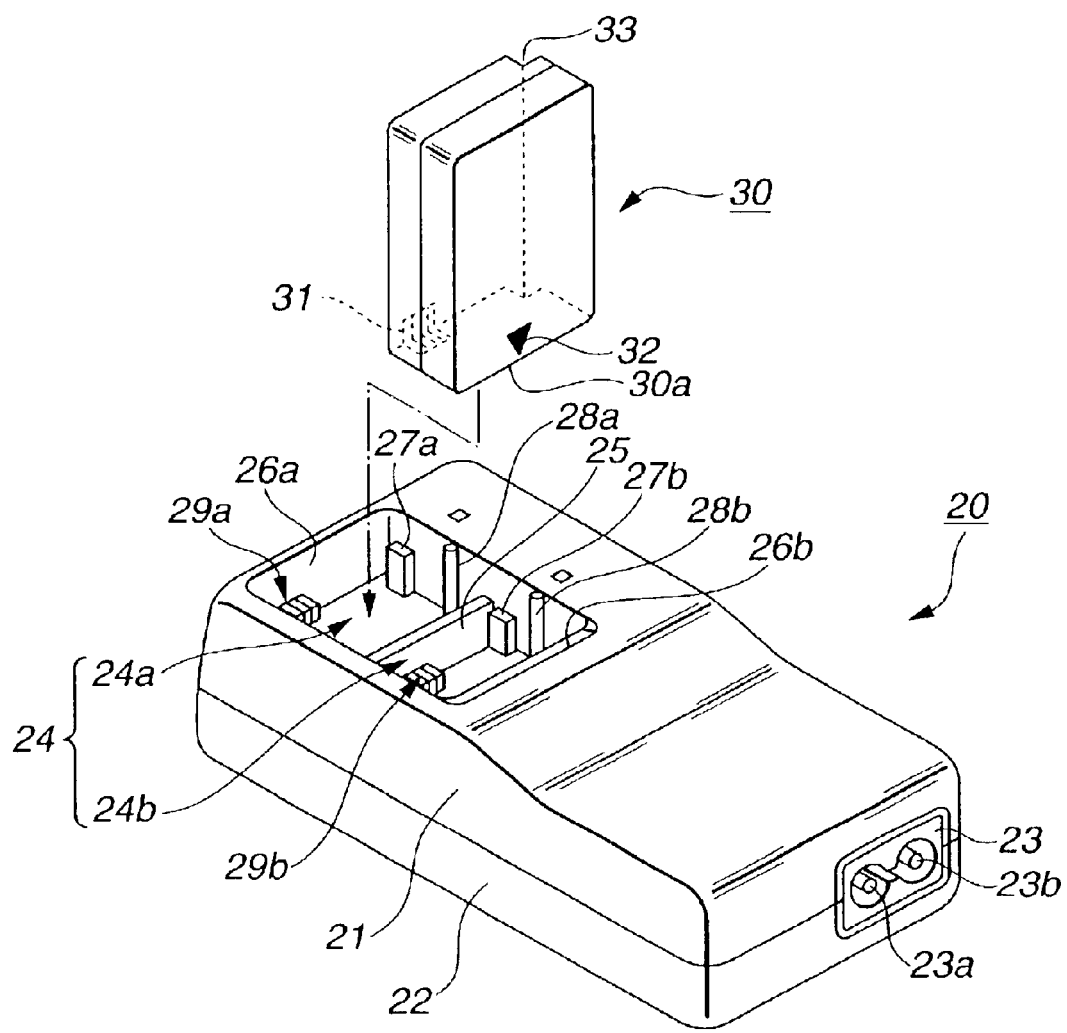
FIG. 2 is a perspective view of a battery pack charging device in which a battery pack according to a second embodiment of the present invention is loaded in a perpendicular direction.

Referring to the drawings, a battery pack charging device, embodying the present invention, will be explained in detail. The battery pack charging device is a battery pack charging device 1, to which a battery pack 15 of a broader width as shown in FIG. 1 is loaded in substantially the horizontal direction, or a battery pack charging device 20, to which a substantially stick-shaped battery pack 30 as shown in FIG. 2 is loaded in substantially the vertical direction. The battery pack charging device 1 or 20 includes a charging unit for charging the battery pack 15 or 30, as loaded, and a detection unit for detecting the loading. The charging unit and the detection unit of the battery pack charging device 1 are common in structure to those of the battery pack charging device 20.

The battery pack charging device 1 includes a casing combined from an upper casing 2 and a lower casing 3, both formed of synthetic resin, as shown in FIG. 1. Within this casing, there are enclosed e.g., a DC power supply circuit unit, a current detection circuit and a control circuit. The battery pack charging device 1 includes a power supply terminal unit 4, having a pair of pin terminals 4a, 4b, on the outer rim of the casing, with a power supply cable being connected to the power supply terminal unit. The current is supplied over a power supply cable from an external power supply, not shown, to a DC power supply circuit unit of the battery pack charging device 1. The battery pack charging device 1 charges a battery pack 15, when the battery pack is loaded in a battery loading section 6, as will be explained subsequently.

In the major surface of the upper casing 2 of the battery pack charging device 1, there is formed the battery loading section 6. The battery pack 15 is introduced into or removed from this battery loading section 6 in substantially the horizontal direction. The battery loading section 6 is a rectangular recess of an outer shape substantially corresponding to the outer shape of the battery pack 15. One lateral side of the battery loading section 6 along its longitudinal direction operates as an abutment surface 6a against which abuts the lateral surface of the battery pack 15 loaded in a manner which will be explained subsequently. A power supply unit 5 is provided to a portion of a bottom surface 6b of the battery loading section 6. The power supply unit 5 is provided on a portion of the bottom surface 6b lying close to the abutment surface 6a. On connection of a relay cord, not shown, to the power supply unit 5, the power supply unit 5 directly relays and supplies the current from the external power supply through the relay cord to equipment to be charged.

In a side-by-side relation with respect to the power supply unit 5, a charging terminal unit 7 and a detection switch 11 detecting the loading of the battery pack 15 are arranged astride the abutment surface 6a and the bottom surface 6b of the battery loading section 6. The charging terminal unit 7 includes a cathode charging terminal 8, an anode charging terminal 9 and a communication terminal 10. The charging terminal unit 7 is loaded on and unified to a terminal block member 40, as later explained, along with the detection switch 11. By the terminal block member 40 being mounted to the casing, the charging terminal unit 7 and the detection switch 11 are positioned to high precision relative to each other. The charging terminal unit 7 is provided with a shutter member, not shown in detail, overlying the terminals 8 to 10 in the non-loaded state of the battery pack 15 and which is rotated on being thrust by the battery pack 15.

The cathode charging terminal 8, the anode charging terminal 9 and the communication terminal 10 are all plate-shaped and face one another with a preset separation in-between. The communication terminal 10 is arranged centrally and the cathode charging terminal 8 and the anode charging terminal 9 are arranged on both sides thereof, with the three terminals being mounted in this state to the terminal block member 40 so that the upper and front side portions thereof are protruded into the battery loading section 6. The cathode charging terminal 8 and the anode charging terminal 9 are connected to a cathode charging terminal and an anode charging terminal of the battery pack 15 loaded in the battery loading section 6 to supply the charging current thereto. The communication terminal 10 is connected to a communication terminal of the battery pack 15 for exchanging the information on the design parameters and on the charging state between the communication terminal 10 and the battery pack 15.

An unlock member 12 is provided on a portion of the major surface of the upper casing 2 of the battery pack charging device 1 facing the charging terminal unit 7 with the battery loading section 6 in-between. An ejection lever 13 is provided to the bottom surface 6b of the battery loading section 6. The unlock member 12 is slidably supported on the upper casing 2, in a manner not shown in detail, and is formed on its one end as one with a lock projection protruded into the battery loading section 6. The unlock member 12 is held by the lock projection engaging with a recess formed in a lateral surface of the battery pack 15 loaded in the battery loading section 6. The ejection lever 13 has its one end towards the unlock member 12 rotatably carried in a manner not shown in detail, whilst the foremost part of the ejection lever 13 is biased in a direction away from the bottom surface 6b of the battery loading section 6 by an elastic member, not shown. When the unlock member 12 is slid to unlock the battery pack 15, the ejection lever 13 thrusts and ejects the battery pack 15 upwards.

With the battery pack charging device 1, a stopper projection 14 is formed as one with an upper portion of the abutment surface 6a of the battery loading section 6 which is in register with the charging terminal unit 7. The stopper projection 14 is formed as one with the upper casing 2 with an amount of protrusion such that the height of the stopper projection 14 from the bottom surface 6b is approximately equal to the thickness of the battery pack 15 so that the separation thereof from the lock projection of the unlock member 12 is slightly larger than the length of the battery pack 15. The stopper projection 14 retains the upper surface of the foremost part of the battery pack 15 loaded in the battery loading section 6 to hold the battery pack 15 in cooperation with the lock projection of the unlock member 12.

In the battery pack charging device 1, the battery pack 15, slightly wider in breadth than the battery loading section 6, is loaded in a substantially horizontal state, with the foremost part of the battery pack 15 being directed slightly downwards. The battery pack 15, used for example as a power supply for a video camera, is comprised of a substantially rectangular housing, made up by an upper half and a lower half, molded of synthetic resin, such as polycarbonate resin, and a chargeable lithium ion secondary cell, enclosed in the housing, in a manner not illustrated in detail. A battery pack charging terminal unit 16 is provided on one longitudinal lateral surface 15a of the battery pack 15, whilst an index 17 indicating the loading direction of the battery pack 15 into the battery loading section 6 of the battery pack charging device 1 is provided on the upper surface of the battery pack 15. The other longitudinal lateral surface of the battery pack 15 is provided with a lock recess 18 engaged by the lock projection of the unlock member 12.

Although not shown in detail, the battery pack charging terminal unit 16 is provided with three recesses, engaged by the cathode charging terminal 8, anode charging terminal 9 and by the communication terminal 10, provided to the battery pack charging device 1, and three terminals, namely a cathode charging terminal, an anode charging terminal and a communication terminal, arranged in these recesses. When the battery pack 15 is loaded in the battery loading section 6, the facing terminals are electrically connected to one another. Meanwhile, the edge portions of the lateral surface 15a and the upper surface of the battery pack 15 are chamfered along the entire width-wise extent to assure facilitated riding of the stopper projection 14 on the upper surface when loading the battery pack 15 in the battery loading section 6.

The battery pack charging device 20 also has its casing formed by combining an upper casing 21 and a lower casing 22, as shown in FIG. 2. Within the casing, there are enclosed a DC power supply circuit, a current detection circuit and a control circuit, as an example. The battery pack charging device 20 also includes a power supply terminal unit 23, having a pair of pin terminals 23a, 23b, on the outer rim of the casing, with a power supply cable being connected to the power supply terminal unit. The current is supplied over a power supply cable from an external power supply, not shown, to the DC power supply circuit unit of the battery pack charging device 20. The battery pack charging device 20 includes two battery loading sections 24a, 24b for simultaneously or separately charging battery packs 30, 30 loaded in these battery loading sections 24a, 24b.

In a major surface of the upper casing 21 of the battery pack charging device 20, there are formed the two battery loading sections 24a, 24b in a side-by-side relation along the longitudinal direction. Two battery packs are introduced into or removed from these battery loading sections in substantially the vertical direction. The battery loading sections 24a, 24b are partitioned from each other by a partition 25, the upper edge of which is at a lower level than the major surface of the upper casing 21. The upper portion of the outer side inner peripheral wall section 26a of the outer side battery loading section 24a is formed as an inclined guide surface progressively inclined from the major surface of the upper casing 21.

On one lateral surface of the battery loading section 24a, extending at right angle to the inclined guide surface 26a, there is formed a guide projection 27a extending in the height-wise direction and which is engaged with a guide step 33 of the battery pack 30 for defining the battery pack loading direction. The battery loading section 24a is also formed with a guide rib 28a extending in the height-wise direction at a mid portion on each lateral surface of the battery loading section 24a extending at right angle to the inclined guide surface 26a for guiding each lateral surface of the battery pack 30. The battery loading section 24a is formed with a charging terminal unit 29a which faces the guide projection 27a and which is formed astride the bottom surface and the vertical surface continuing to the inclined guide surface 26a of the battery loading section 24a.

The upper portion of an inner side inner wall section 26b of the inner side battery loading section 24b facing the inclined guide surface 26a of the battery loading section 24a is formed as an inclined guide surface which is progressively inclined from the major surface of the upper casing 21. In the battery loading section 24b, a guide projection 27b for defining the loading direction of the battery pack 30 is formed on the inner surface of the partition 25 facing the inclined guide surface 26b. The battery loading section 24b is also formed with a guide rib 28b extending in the height-wise direction at a mid portion on each lateral surface of the battery loading section 24b extending at right angle to the inclined guide surface 26b for guiding each lateral surface of the battery pack 30. The battery loading section 24b is also provided with a charging terminal unit 29b which faces the guide projection 27b and which is formed astride the inner and bottom surfaces of the partition 25.

In each of the battery loading sections 24a, 24b of the battery loading section 24, there is provided a detection switch, not shown in detail, for detecting the event of the loading of the battery pack 30, in a side-by-side relation to the charging terminal unit 29. The charging terminal unit 29 and the detection switch are of the same structure as the charging terminal unit 7 and the detection switch 11 loaded on the terminal block member 40 of the battery pack charging device 1 described above. The charging terminal unit 29 also includes a cathode charging terminal, an anode charging terminal and a communication terminal and is loaded along with the detection switch as-one on the terminal block member 40 which will be explained subsequently. The charging terminal unit 29 and the detection switch are positioned to high precision in each of the battery loading sections of the battery loading section 24 by the terminal block member 40 being mounted to the casing.

The respective plate-shaped terminals of the charging terminal unit 29 are all plate-shaped and face one another with a preset separation in-between. The communication terminal is arranged centrally and the cathode charging terminal and the anode charging terminal are arranged on both sides thereof, with the three terminals being mounted in this state to the terminal block member. The upper ends and the foremost parts of the cathode charging terminal, anode charging terminal and the communication terminal are adapted to be intruded into the battery loading section 24. The cathode charging terminal and the anode charging terminal are connected to a cathode charging terminal and an anode charging terminal of the battery pack 30 loaded in the battery loading section 24 to supply the charging current to the battery pack. The communication terminal is connected to a communication terminal of the battery pack 30 so that the information on the design parameters and on the charging state will be exchanged between the communication terminal and the battery pack 30.

In each of the battery loading sections 24a, 24b of the battery pack charging device 20 is loaded a stick-shaped battery pack 30 smaller in size than the battery pack 15 charged by the battery pack charging device 1. The battery pack 30 is loaded in a substantially vertical position into the battery loading section 24 with a longitudinal lateral side 30a as a loading side. A chargeable lithium ion secondary cell is similarly accommodated in a rectangular casing of synthetic resin of the battery pack 30, in a manner not shown in detail. The battery pack 30 is provided with a charging terminal unit 31 lying astride a lateral surface 30a and one of the major surfaces thereof and with an index 32 on the other major surface thereof. The index 32 indicates the direction of loading of the battery pack charging device 20 to the battery loading section 6. The battery pack 30 is also provided with a step 33 forming a recess in the height-wise direction, with the recess lying astride the major surface provided with the charging terminal unit 31. When the battery pack 30 is loaded in the battery loading section 24, the guide projection 27 is fitted in the step 33, as described above, to define the loading orientation of the battery pack 30.

Similarly to the charging terminal unit 16 of the battery pack 15, the charging terminal unit 31 is provided with three recesses, engaged by the cathode charging terminal, anode charging terminal and by the communication terminal, provided to the battery pack charging device 20, and with three terminals, namely a cathode charging terminal, an anode charging terminal and a communication terminal, arranged in these recesses. When the battery pack 30 is loaded in the battery loading section 24, the respective mating terminals in the charging terminal unit 31 are electrically connected to one another.

In each of the battery pack charging device 1 and the battery pack charging device 20, the terminal block member 40 is used in common, as described above, to constitute the charging terminal unit and the loading detection unit. The terminal block member 40 includes, as a basic member, a molded frame 41 of a substantially plate shape of a thicker thickness, molded from a synthetic resin material, such as polyethylene terephthalate resin. The molded frame 41 is provided with a mounting recess 42 for mounting to e.g., a circuit substrate mounted in position to the lower casing 3 and with a arm-like mounting recess 43 having a mounting hole 43a.

Figure 3:
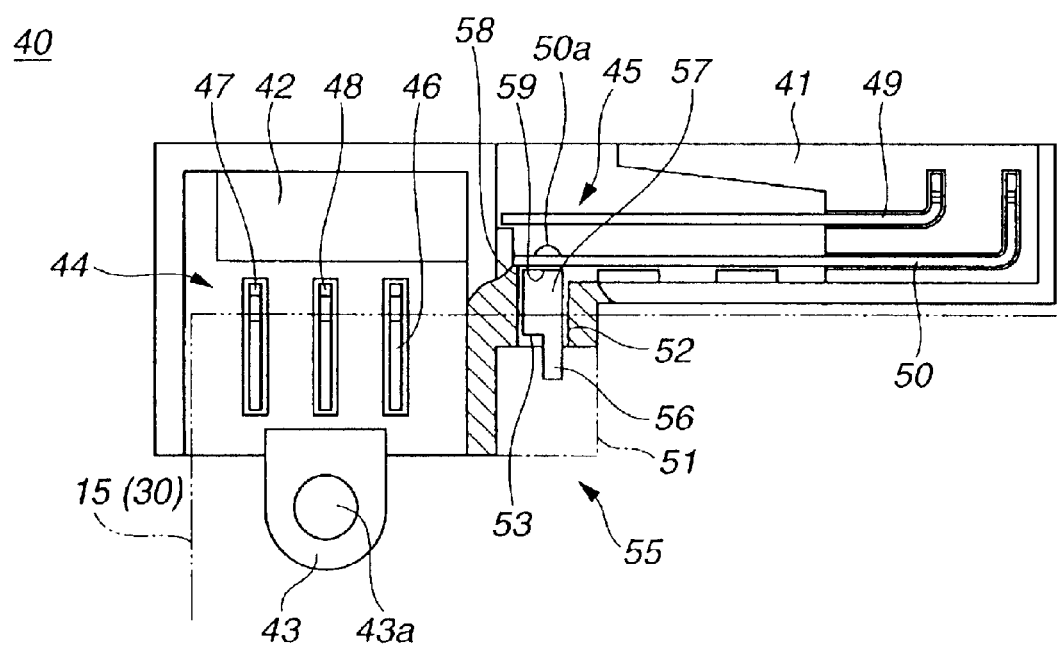
FIG. 3 is a back side view showing a terminal block member provided on the battery pack charging device, with a portion thereof being cut away.

The molded frame 41 in the terminal block member 40 is divided into two regions along the lengthwise direction, as shown in FIG. 3, with a first one and a second one of these two regions forming a charging section 44 and a detection section 45, respectively. The charging section 44 is provided with a cathode terminal member 46, an anode terminal member 47 and a communication terminal member 49, which are insert-molded parallel to and at a preset interval from one another. A fixed contact member 49 and a movable contact member 50 are carried on a site extended laterally from the charging section 44 of the detection section 45, whilst an actuation member 55, actuated by the battery pack 15, is slidably assembled to the detection section 45.

Figure 4:
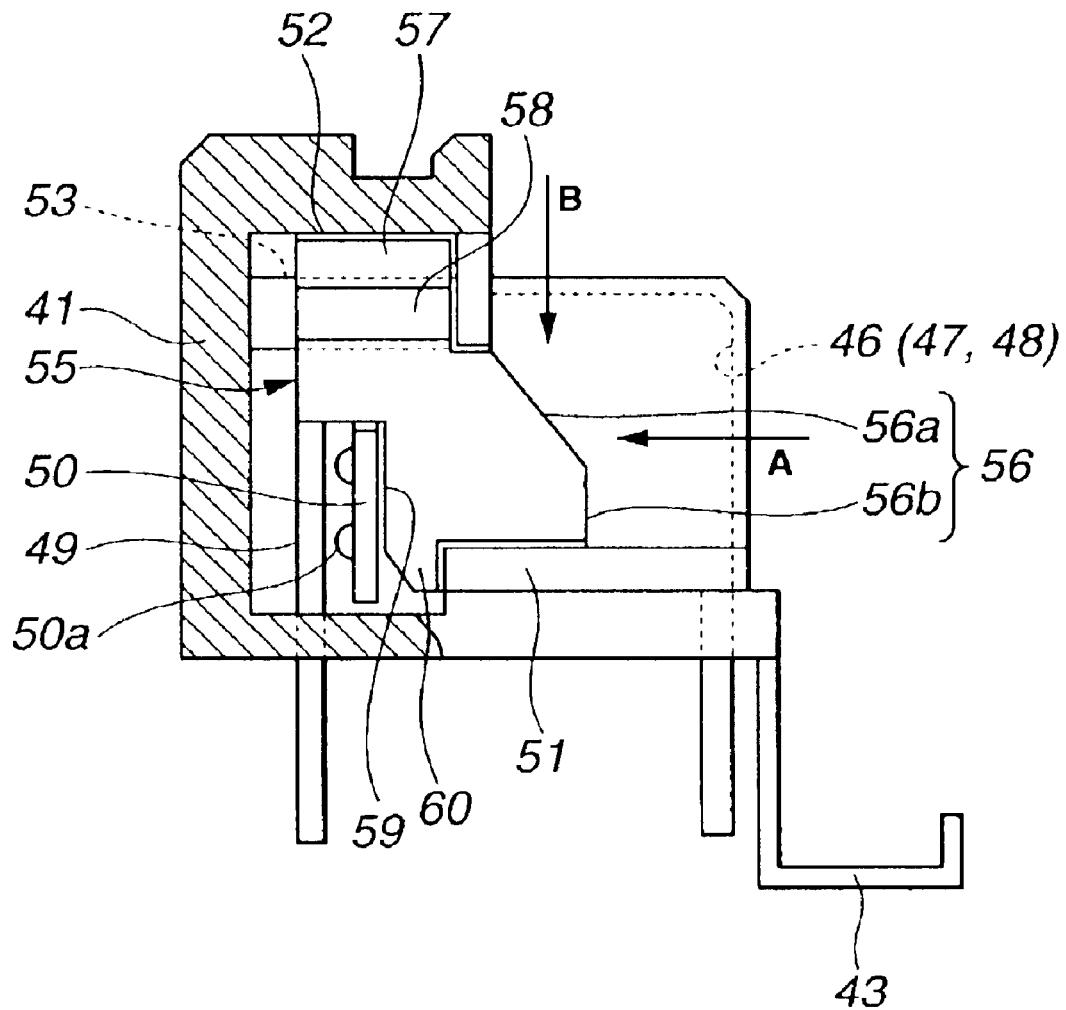
FIG. 4 is a side view showing the terminal block member, with a portion thereof being cut away.

The respective terminal members 46 to 49 of the charging section 44 are each carried by having a region of the rectangular plate-shaped connecting portion inserted into the molded frame 41, as indicated with broken lines in FIG. 4, with the lower end of the free end side region thereof being exposed at upper and foremost portions thereof and with a terminal portion formed as one with the proximal side being carried on a supporting wall section 51. The terminal members 46 to 49 are provided with terminal portions protruded as one on the lower ends thereof, as shown in FIG. 4, with the terminal portions traversing the supporting wall section 51 so as to be protruded towards the bottom side.

The fixed terminal member 49 and the movable contact member 50 of the detection section 45 have one ends fixedly supported by the molded frame 41, so as to be normal to the terminal members 46 to 49 of the charging section 44, as shown in FIG. 3. The fixed terminal member 49 and the movable contact member 50 face each other at a preset separation, with terminal sections at the fixed ends traversing the molded frame 41 and extending in the same direction towards the bottom side as that of the terminal sections of the terminal members 46 to 49. The fixed terminal member 49 has its free end positioned by a stopper projection formed protuberantly as one with the molded frame 41, as shown in FIG. 3.

The movable contact member 50 has its one end secured to the molded frame 41 so that such an elastic force will be accumulated which tends to move the free end of the movable contact member 50 away from the fixed terminal member 49. The free end side of the movable contact member 50 faces an operating part 59 of the actuation member 55, as shown in FIG. 3. When the battery pack 15 or 30 is not loaded in the battery loading section 6 or 24, the movable contact member 50 is held in such a state in which a contact 50a formed on the inner surface of the foremost part of the movable contact member 50 will be out of contact with the fixed terminal member 49. With the elastic force stored in the movable contact member 50 as described above, the mistaken contact thereof with the fixed terminal member 49 may be suppressed even on application of e.g., vibrations.

The molded frame 41 is formed as one with an operating guide member 52 which separates the charging section 44 and the detection section 45 from each other and on which is slidably assembled the actuation member 55. The operating guide member 52 is formed with guide holes of a vertically elongated rectangular cross-section extending parallel to the terminal members 46 to 49. The facing inner surfaces of the guide holes are formed with recessed longitudinally extending slide guide grooves 53.

The actuation member 55 is formed as one from a synthetic resin material, such as polyethylene terephthalate. The actuation member 55 is in a substantially rectangular plate shape, as shown in FIG. 4, and is formed as one with a cam 56, a slide guide 57, a slide guide projection 58, an actuation part 59 and a stopper projection 60. The actuation member 55 is slid in a direction parallel to the terminal members 46 to 49 to thrust the movable contact member 50 of the detection section 45, by the cam 56 being thrust by the battery pack 15 or 30, loaded on the battery loading section 6 or 24, as will be explained subsequently in detail.

The cam 56 is formed on one end of the actuation member 55 and includes an inclined cam portion 56a and a vertically extending cam portion 56b, extending from the lower end of the inclined cam portion 56a to the lower end thereof carried by the supporting wall section 51, as shown in FIG. 4. The inclined cam portion 56a of the is designed so that its protrusion is progressively increased towards the lower end thereof by bias cutting from an upper end to a foremost part of the cam portion 56a. The actuation member 55 has its vertically extending cam portion 56b thrust by the battery pack 15 loaded in the horizontal direction to the battery loading section 6, as indicated by arrow A in FIG. 4. The actuation member 55 also has its inclined cam portion 56a thrust by the battery pack 30 loaded from above to the battery loading section 24, as indicated by arrow B in FIG. 4.

A slide guide unit 57 is slid in a guide hole of the guide member 52 provided to the molded frame 41. A pair of slide guide projections 58 are formed on the entire longitudinal extent of the lateral surfaces of the slide guide unit 57, these guide projections 58 engaging in slide guide grooves 53 formed in the inner surfaces of the guide member 52. By the slide guide unit 57 being slid, with the slide guide projection 58 engaging in the slide guide grooves 53, the actuation member 55 thrusts the major surface of the movable contact member 50 in the vertical direction. In this manner, the actuation member 55 is able to perform smooth sliding movement, in such a manner as to prevent distortion of the movable contact member 50, to effect accurate switching.

The actuation member 55 is formed as one with the actuation part 59 on its lateral end facing the cam 56. When the battery pack 15 or the battery pack 30 is not loaded in the battery loading section 6 or 24, the operating portion 59 abuts against the outer lateral surface of the free end of the movable contact member 50, as shown in FIG. 3, and is subjected to the elastic force accumulated in the movable contact member 50. Thus, the actuation member 55 is biased towards right in FIG. 4 so that a stopper projection 60 formed as one with the lower end thereof abuts against the end of the supporting wall section 51 to prevent inadvertent descent of the actuation member 55 from the molded frame 41.

The above-described terminal block member 40 is mounted in a mounting opening formed in the battery loading section 6 of the above-described first battery pack charging device 1 so that the respective terminal members 46 to 49 and the actuation member 55 will be parallel to the bottom surface 6b. The terminal block member 40 is also mounted in the mounting opening formed in the battery loading section 24 of the above-described second battery pack charging device 20 so that the respective terminal members 46 to 49 and the actuation member 55 will be normal to the bottom surface 6b. The actuation member 55 of the terminal block member 40 is also slid in the same direction by the battery pack 15, loaded in substantially the horizontal direction into the battery loading section 6 in the battery pack charging device 1 or by the battery pack 30 loaded in substantially the vertical direction into the battery loading section 24 in the second battery pack charging device 20.

When the terminal block member 40 is assembled to the first battery pack charging device 1, the battery pack 15 thrusts the vertically extending cam portion 56b to cause the actuation member 55 to be slid in the same direction as the loading direction of the battery pack 15 to cause the actuation part 59 to thrust the movable contact member 50 into contact with the fixed terminal member 49. When the terminal block member 40 is assembled to the second battery pack charging device 20, the battery pack 30 thrusts the inclined cam portion 56a to cause the actuation member 55 to be slid in a direction normal to the loading direction of the battery pack 15, that is in the same direction as that of the first battery pack charging device 1, with the actuation part 59 then thrusting the movable contact member 50 into contact with the fixed terminal member 49.

Figure 5:
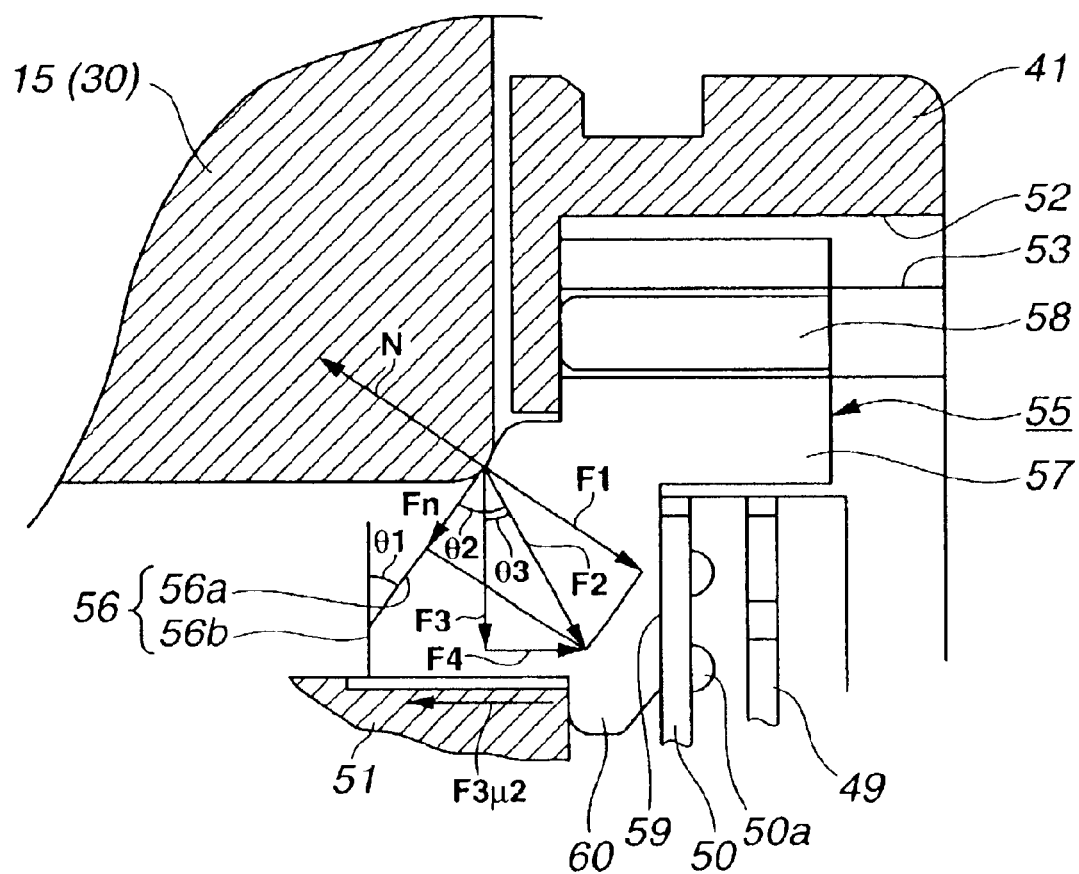
FIG. 5 schematically shows the operation of an actuation member by the battery pack.

The terminal block member 40 is designed and constructed so that the actuation member 55 will be driven smoothly in consideration of the frictional resistance produced between the battery pack 15 and the inclined cam portion 56a of the actuation member 55 and that produced between the supporting wall section 51 of the molded frame 41 and the lower end of the actuation member 55 when the battery pack 15 thrusts the inclined cam portion 56a to cause sliding movement of the actuation member 55. If, in the terminal block member 40, the frictional coefficient operating between the battery pack 15 and the actuation member 55 and that between the supporting wall section 51 and the actuation member 55 are $\mu 1$ and $\mu 2$, respectively, the components of force acting in various directions on the actuation member 55, thrust by the battery pack 15, may be analyzed as shown in FIG. 5.

Specifically, the force component F1 acting at right angles to the cam surface of the inclined cam portion 56a, the force component Fn acting parallel to the cam surface of the inclined cam portion 56a, the force component F2 acting at an angle $\theta 3$ relative to the vertical direction and the force component F3 acting in the vertical direction, may be represented by the following equations:

$$Fn = \mu 1 \times F1$$

$$(F2)^2 = F1^2 + Fn^2$$

$$F2 = F1\sqrt{(1+\mu^2)}$$

$$\theta 2 = \tan^{-1}(F1/Fn)$$

$$\Theta 3 = \theta 2 - \theta 1$$

$$F3 = F2 \times \cos(\theta 3)$$

$$F4 = F2 \times \sin(\theta 3).$$

From the above equations, the condition under which the actuation member 55 is able to perform sliding movements is given by $$F4 > F3 \times \mu 2$$

and $$F4/F3 > \mu 2.$$

Thus, if the angle of inclination of the inclined cam portion 56a is $\theta 1 = 30°$, with $\mu 1$ being 0.4, $$Fn = 0.4 \times F1$$

$$(F2)^2 = F1^2 + Fn^2$$

$$F2 = F1\sqrt{(1+0.4^2)} = 1.077 F1$$

$$\theta 2 = \tan^{-1}(1/0.4) = 68.2°$$

$$\theta 3 = \theta 2 - \theta 1 = 68.2 - 30 = 38.2°$$

$$F3 = F2 \times \cos(38.2°) = 0.846 F$$

$$F4 = F2 \times \sin(38.2°) = 0.636 F$$

the conditions under which the actuation member 55 is able to perform a sliding movement are given by:

$$0.636F > 0.869F \times \mu 2$$

$$0.636/0.869 > \mu 2$$

and $$0.731 > \mu 2.$$

It is noted that the present invention is not limited to the battery pack charging device, shown in the above-described various embodiments, nor to the battery packs thereby charged. The battery pack charging device may be designed so that the battery pack is loaded in the battery loading section in an inclined orientation, in which case it is sufficient if the terminal block member 40 is mounted in the battery loading section 40 in an orientation orthogonal or parallel to the battery pack inserting direction.

What is claimed is:

1. A charging device for charging a battery pack comprising:
   a charging terminal member arranged in a loading section in which said battery pack is accommodated, said charging terminal member being connected to a charging terminal of said battery pack; and
   a detection switch including an actuation member actuated by said battery pack and a switching element opened/closed by said actuation member, said detection switch serving for detecting the loading of said battery pack and to initiate and maintain charge current to said battery pack;
   said charging terminal member and said detection switch positioned on a terminal block member mounted in said loading section, said charging terminal member being connectable to a charging terminal of a first battery pack and to a charging terminal of a second battery pack, said detection switch being mounted so that the actuation member is actuatable in the same direction by said first and second battery packs.

2. The battery pack charging device according to claim 1 wherein a communication terminal member connectable to communication terminals provided to said first and second battery packs is assembled to said terminal block member.

3. The battery pack charging device according to claim 2 wherein said actuation member is slidably assembled to a slide guide unit provided to said terminal block member; and
   wherein a slide guide projection and a slide guide recess are provided to the outer lateral surface of the actuation member and to the inner surface of said slide guide recess, respectively.

4. The battery pack charging device according to claim 1 wherein said actuation member is provided with an actuation part protruded into said loading section so as to be thrust by said battery pack; and
   wherein said actuation part is made up by a first actuation portion comprised of an inclined cam thrust by said first battery pack and a second actuation portion comprised of a vertically extending cam thrust by said second battery pack.

* * * * *